Sept. 13, 1932.　　　F. H. LANG ET AL　　　1,876,978
DISPLAY DEVICE
Original Filed Aug. 1, 1929
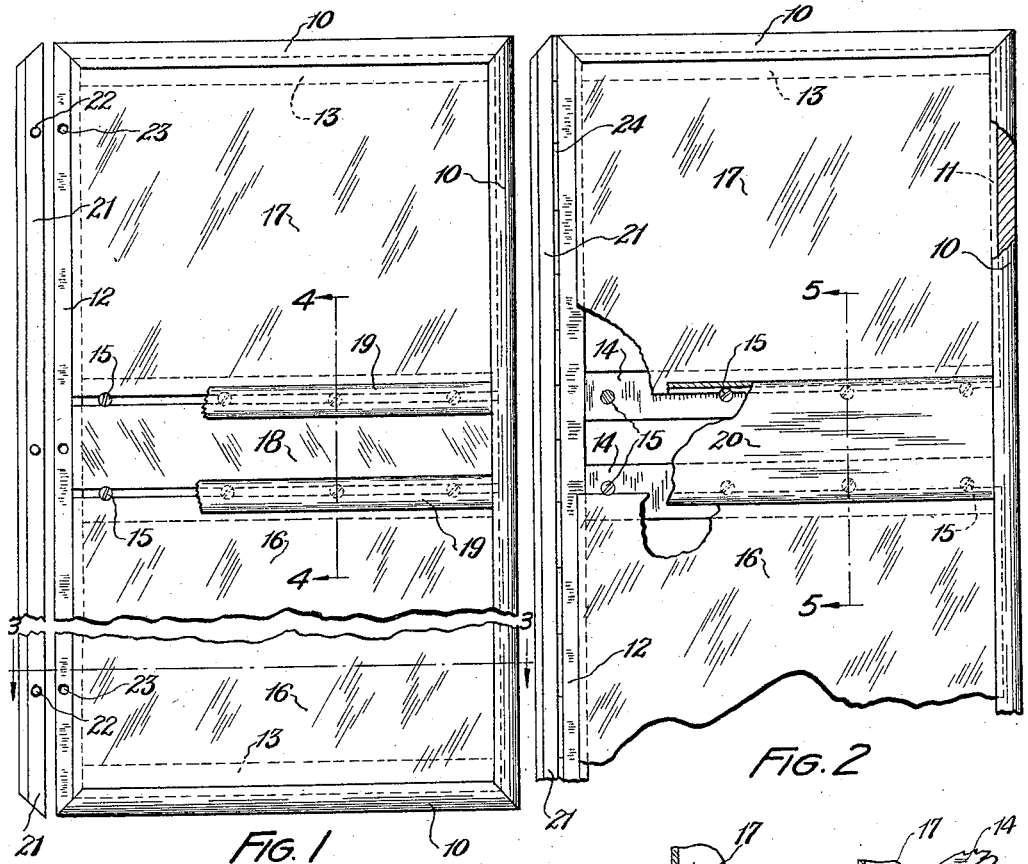
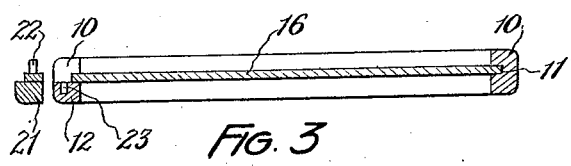
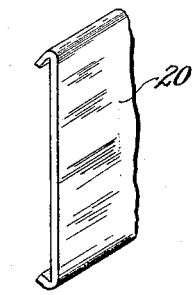
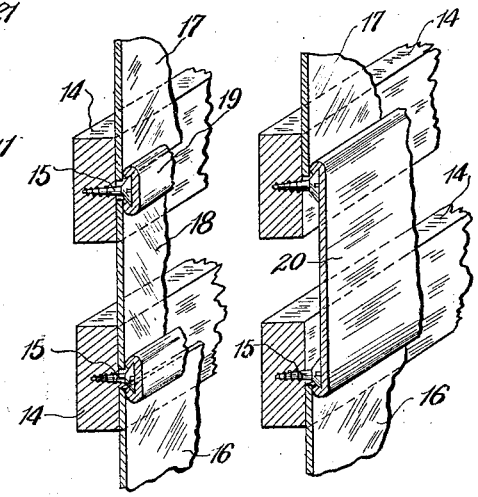
INVENTORS:
FREDERIC H. LANG.
NATHAN E. VANSTONE.
ATTORNEYS.

Patented Sept. 13, 1932

1,876,978

UNITED STATES PATENT OFFICE

FREDERIC H. LANG AND NATHAN E. VAN STONE, OF CHICAGO, ILLINOIS, ASSIGNORS TO THE SHERWIN-WILLIAMS COMPANY, OF CLEVELAND, OHIO, A CORPORATION OF OHIO

DISPLAY DEVICE

Original application filed August 1, 1929, Serial No. 382,757. Divided and this application filed November 3, 1931. Serial No. 572,824.

This invention relates to a display device and more particularly to a device for illustrating the effect of finishing an object or structure in various colors or color combinations, and the present application is a division of our prior application Serial No. 382,757, filed August 1, 1929, Patent No. 1,839,972, issued January 5, 1932.

The invention will be described with reference to a device for displaying the effect of finishing automobile bodies in various colors or color combinations but it should be understood that the utility of the device is not limited to this particular field, since it could be used advantageously for displaying the effect of different colors or color combinations in the finishing of any other structure or article, such as a railway coach, airplane or building.

An object of the invention is to provide a device whereby any number of different colors or color combinations may be displayed in substantially the same form and manner of arrangement in which it is proposed to finish a structure or article, with the result that the prospective purchaser may readily ascertain the desirability of any color scheme.

Another object is to provide a device of this kind wherein the changes from one color or color combination to any other color or color combination may be readily and quickly accomplished.

Other objects of the invention and the features of novelty will be apparent from the following description taken in connection with the accompanying drawing, of which Figure 1 is a front elevation of one form of the device embodying our invention, certain portions thereof being broken away;

Fig. 2 is a fragmentary view, similar to Fig. 1 but illustrating a slightly modified form of the device, certain portions thereof being likewise broken away;

Fig. 3 is a sectional view taken substantially on the line 3—3 of Fig. 1 and looking in the direction of the arrows;

Fig. 4 is an enlarged perspective detail with certain parts shown in section on the line 4—4 of Fig. 1;

Fig. 5 is a view similar to Fig. 4 but showing the device illustrated in Fig. 2, with certain parts shown in section on the line 5—5 of Fig. 2; and Fig. 6 is a fragmentary perspective of the end portion of one of the parts shown in Fig. 2.

The devices illustrated in the drawing are particularly useful for displaying the effect of various colors or color combinations with which it is proposed to finish automobile bodies, since such devices may represent a door, a quarter panel, a tonneau panel or any other part of the exterior surface of the automobile body. The devices are so constructed that various colors or color combinations, with which an automobile body may be finished, can be conveniently and quickly displayed to a proposed purchaser and particularly to the purchasing or designing departments of automobile body manufacturers or to customers of refinishing shops.

In the forms of the invention illustrated in the drawing, a frame is provided which may be of the full size of the average automobile door, panel or section, or, if desired, for purposes of convenience, it may be reduced in size. This frame is formed at the top and bottom and on one side edge of strips 10, of any desirable material, suitably connected together at their meeting ends and provided throughout their lengths with a groove 11 on the inner side of each strip. The other longitudinal edge of the frame is formed of a flat strip 12 suitably connected with the end strips 10 and having its upper surface in the plane of one of the sides of the grooves 11. It will be understood that, although the strips 10 have been described as being integral, they could each equally as well be formed of a plurality of strips joined together so as to provide a groove between the adjacent surfaces and similar to the grooves 11. It should also be noted that the two end strips are provided with portions 13 extending inwardly of the frame from the groove 11 so as to form a better support for the panels of different colors which are arranged in the frame, as will be described hereinafter. Intermediate the ends of the frame, and preferably located at a point illustrating the position of the belt or molding of an automobile body, cross members 14 are positioned between the side member 10 and the side member 12, such cross members, in the present instance, being shown as two spaced bars, although it is obvious that a single bar of proper width could be used for this purpose.

The upper surfaces of the cross members 14 are flush with the upper surface of the strip 12 and the lower side of the groove 11 and a number of retaining members 15, such as screws, are arranged in each cross member to form two parallel rows. The heads of the retaining members, or screws, 15, are spaced from the surface of the cross members, as illustrated in the drawing.

When it is desired to display to a prospective customer the appearance that a certain color or color combination will give to an automobile body or to any part thereof, it is merely necessary to arrange in the frame, above described, a combination of panels, preferably made from sheet metal, and painted or otherwise finished in the desired colors. In Fig. 1 these panels are indicated at 16, 17 and 18 and the edges of the panels engage the grooves 11 and the screws or retaining members 15, as shown.

The panel 16 may be of such size as to represent the lower panel or main color of the body. Similarly, the panel 17 may represent an upper panel of the body, and the panel 18, which is positioned between the two rows of screws 15, may represent what is known as the belt line of the body. When the intermediate panel 18 is used, it is necessary to employ a double row of molding strips 19 to conceal the meeting edges of the panels 16, 17 and 18. As shown in the drawing, the molding strips 19 are of channel shape with their edge flanges turned inwardly so that they will slide over and be retained by the heads of the screws 15.

In Figs. 2 and 5 there is illustrated an arrangement in which the intermediate panel 18 is omitted and a relatively wide belt or molding strip 20 is employed in place of the two molding strips 19 shown in Fig. 1. The construction of the molding strip 20 is similar to that of the strips 19, except as to width, and the edge flanges of the strip 20 engage the rows of screws 15.

In order to secure the panels and molding strips in the frame after they have been properly positioned therein, a retaining strip 21 is arranged to fit upon the upper side of the flat strip 12. From Figs. 1 and 3 it will be noted that the retaining strip 21 is shown as entirely separate from the frame but capable of being assembled therewith by means of a number of dowel pins 22 extending from the surface thereof and adapted to engage in holes 23 formed in the upper surface of the flat strip 12.

In Fig. 2 the retaining strip 21 is shown as connected to the flat strip 12 by means of a piano hinge 24 and, in this case, it is merely necessary to swing a strip 21 from its normal position over the strip 12, to the position shown in Fig. 2, in order to permit the insertion or removal of any of the panels or molding strips.

From the foregoing description the advantages of the invention will become apparent. It is clear that a display device thus constructed presents a novel and easy way of displaying new colors and different color combinations to the public, and especially the proposed color combinations for automobile bodies to the purchasing agents and designing engineers of automobile or automobile body manufacturers or concerns which build airplanes, railway coaches, and other structures. It is not necessary for the salesman to carry with him a number of model doors, panels or sections showing different color combinations, since the one frame can be used with any number of differently colored panels to show any proposed or suggested color combination. Because of this, the frame may be made full size and, therefore, the colored panels supported in the frame will more accurately and clearly give the finished effect of an automobile body finished in the different color combinations. Not only will the device have particular utility in displaying color combinations to large purchasers, but it also has utility in re-paint shops to display to prospective customers the effect of different color combinations. It should be understood that when it is desired to have the frame represent an automobile door that the upper panel may be omitted to provide the window.

Although certain embodiments of the invention have been illustrated and described herein, it is not intended to limit the invention thereto, except insofar as the scope of the appended claims so limits it.

Having thus described our invention, we claim:

1. A display device of the character described comprising, in combination, a frame having opposed inner grooves therein, a pair of cross members, retaining members mounted on each cross member, upper and lower colored panels slidably supported between the retaining members and grooves, and an intermediate panel slidable upon said retaining members and serving to conceal the same.

2. In a display device of the character described, a frame having a cross member intermediate its ends, retaining members on said cross member, a plurality of panels positioned in said frame and held in spaced relation by said retaining members, and a strip having flanged edges to engage with said retaining members and be slidably held thereby in position to conceal said retaining members and the space between said panels.

3. In a display device of the character described, a frame having a cross member intermediate its ends, a plurality of spaced retaining members on said cross member, said retaining members having heads, a plurality of panels positioned in said frame and held in spaced relation by said retaining members, and a strip having flanged edges to cooperate with the heads of said retaining members and be slidably held thereby in position to conceal said retaining members and the space between said panels.

4. In a display device of the character described, a frame, a cross member supported by said frame intermediate its ends, a groove in said frame opening towards said cross member, a retaining member carried by said cross member, a colored panel slidably supported between said groove and said retaining member, and a panel slidable upon said retaining member and serving to conceal the same.

5. In a display device of the character described, a frame, means supported by said frame intermediate its ends adapted to support retaining members, a plurality of panels supported in said frame and held in spaced relation by said retaining members, and a strip slidably supported by said retaining members adapted to conceal said retaining members and the space between said panels.

In testimony whereof, we hereunto affix our signatures.

FREDERIC H. LANG.
NATHAN E. VAN STONE.